United States Patent
Lührs et al.

[19]

[11] Patent Number: 5,924,526
[45] Date of Patent: Jul. 20, 1999

[54] INSIDE SHOE DRUM BRAKE

[75] Inventors: Ronald Lührs, Baunach; Jürgen Schwappach, Ebern, both of Germany

[73] Assignee: Fahrzeugtechnik Ebern GmbH, Germany

[21] Appl. No.: 08/865,957

[22] Filed: May 30, 1997

[30] Foreign Application Priority Data

Jun. 5, 1996 [DE] Germany ............ 196 22 520

[51] Int. Cl.⁶ .................................................. F16D 51/00
[52] U.S. Cl. ............................................................ 188/78
[58] Field of Search ................... 188/78, 79.54, 188/106 F, 250 E, 325, 326, 327, 328, 340

[56] References Cited

U.S. PATENT DOCUMENTS

| | | |
|---|---|---|
| 3,177,978 | 4/1965 | Weltyk . |
| 3,220,515 | 11/1965 | Miller . |
| 4,182,439 | 1/1980 | Kluger et al. . |
| 4,232,766 | 11/1980 | Rupprecht . |
| 4,456,103 | 6/1984 | Muscat . |
| 4,470,486 | 9/1984 | Spitler .................................. 188/79.54 |
| 4,817,765 | 4/1989 | Turak et al. ......................... 188/218 A |
| 5,029,676 | 7/1991 | Yamamoto ............................ 188/79.54 |
| 5,163,526 | 11/1992 | Morgun et al. ...................... 188/250 G |
| 5,553,691 | 9/1996 | Mery et al. .............................. 188/328 |

FOREIGN PATENT DOCUMENTS

| | | |
|---|---|---|
| 0 363 637 A1 | 4/1990 | European Pat. Off. . |
| 11 03 160 | 3/1961 | Germany . |
| 26 44 575 C3 | 4/1978 | Germany . |
| 29 03 051 A1 | 8/1979 | Germany . |
| 42 03 173 A1 | 8/1992 | Germany . |

*Primary Examiner*—Lee W. Young
*Assistant Examiner*—Melanie Talavera
*Attorney, Agent, or Firm*—McAndrews, Held & Malloy, Ltd.

[57] ABSTRACT

An inside shoe drum brake, particularly for motor vehicles, is disclosed which comprises a support arrangement for the brake shoes which can be pressed by means of an actuation device against the brake drum, and which has a brake anchor plate carrying the support arrangement and the actuation device as well as comprising an area for the attachment to a wheel carrier. According to the invention, a guide element is provided which is engaged in the axial direction of the brake with the brake shoes and which is guided, in a sliding manner, on the attachment area or on the actuation device. Thus a simply designed and lightweight inside shoe drum brake is provided which has an optimized noise behavior with respect to brake squeal.

32 Claims, 5 Drawing Sheets

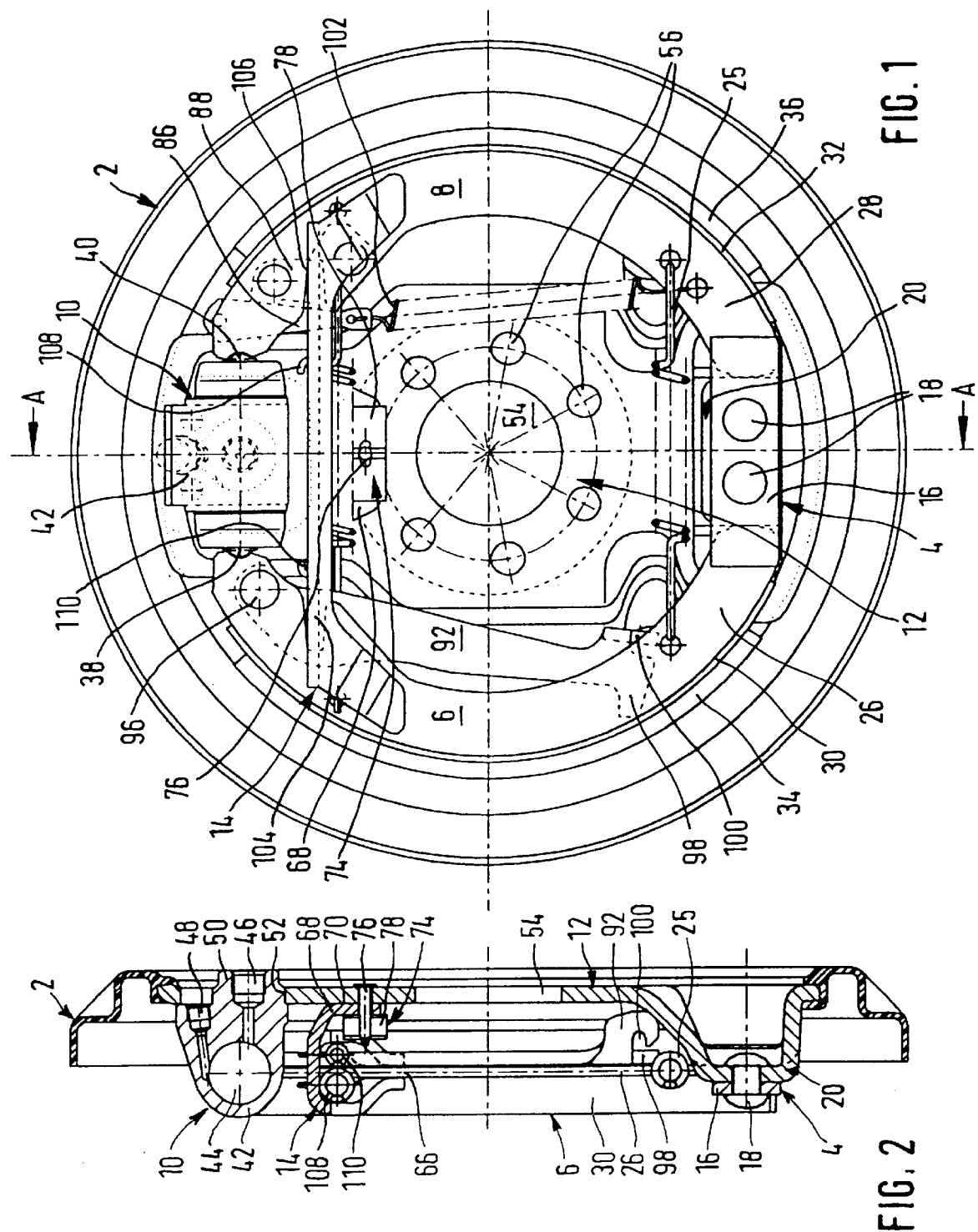

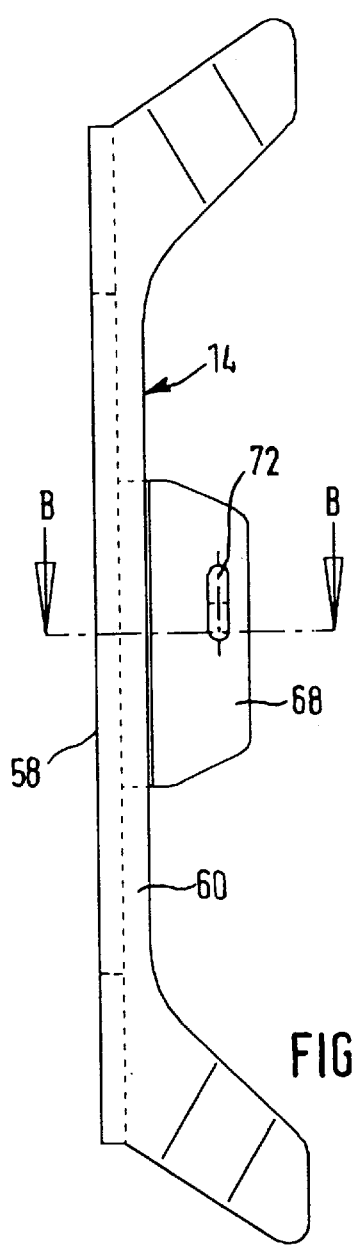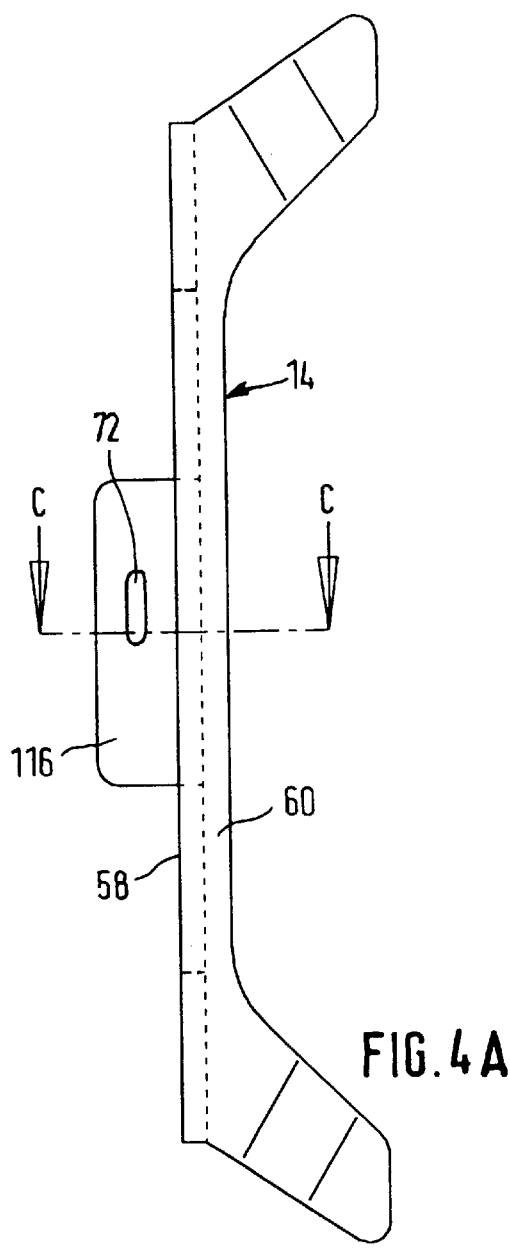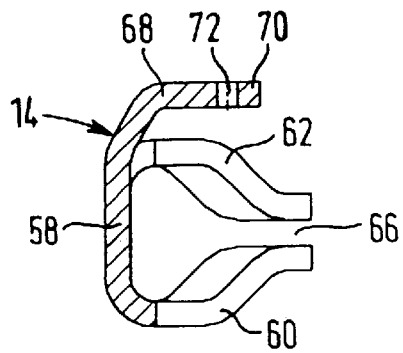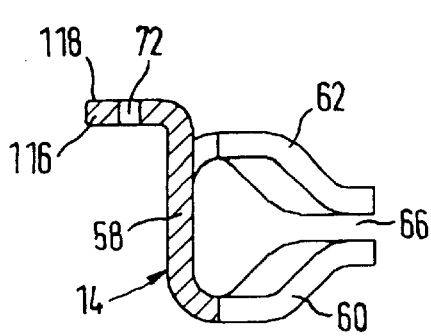

INSIDE SHOE DRUM BRAKE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Inside shoe drum brakes are used in hydraulic brake installations for passenger cars and commercial cars as two-shoe drum simplex brakes. It is a known problem of such inside shoe drum brakes that during operation the brake shoes are abutted against the brake drum, and an unpleasant operating noise develops, the so-called brake squeal. In the state of the art, there have been many attempts to reduce or to eliminate brake squeal by special construction designs of the inside shoe drum brake.

Thus, from German Patent Publication DE-AS 1,103,160 an inside shoe drum brake is known with a brake anchor plate to which contact plates are attached which form flat contact surfaces extending perpendicular to the brake axis, for the inside lateral surfaces of the brake shoes which are pivotally supported with respect to the brake anchor plate. A bolt which is attached to the brake anchor plate passes through each brake shoe bar. Between the lateral surfaces of the brake shoe bars, which are turned away from the brake anchor plate, and the bolt ends, a pressure spring is arranged on each bolt, which biases the respective brake shoe in the axial direction against the corresponding contact plate. The result is that the brake shoes with their interior lateral surfaces are always firmly braced against the contact plates, so that an oscillating of the brake shoes and a corresponding excitation of the brake drum are avoided.

Further, it is known to provide, on the brake anchor plate (U.S. Pat. No. 3,177,978) or on the brake shoes (U.S. Pat. No. 3,220,515), a plurality of small bearing blocks made of a material with low coefficient of friction, which brace the brake shoes which are biased by means of springs in the direction of the brake anchor plate, on their interior lateral surfaces with respect to the brake anchor plate, to avoid oscillation of the brake shoes.

Furthermore, the generic German Patent Publication DE 4,203,173 A1 discloses an inside shoe drum brake with a bearing block for receiving the circumferential forces of the brake shoes which can be pressed by means of a hydraulic wheel brake cylinder against the brake drum, and a brake anchor plate which carries the bearing block and the wheel brake cylinder and which comprises an area for the attachment of the brake to a wheel carrier.

According to this state of the art, the brake anchor plate is constructed in a sandwich pattern using two plate parts with different material thickness, of which the first plate part which can be attached to the wheel carrier has a larger material thickness and carries the bearing block for the brake shoes, whereas the second plate part has a smaller material thickness and serves for the attachment of the wheel brake cylinder. The second plate part has several contact surfaces and small plates, respectively, made of a material which allows sliding, against which the brake shoes which are biased by means of springs in the direction of the brake anchor plate are held in contact with their interior lateral surfaces, or two curved brace areas which are axially projecting in the direction of the brake drum and which are provided with a covering which can slide, and with which the biased brake shoes are in contact with their bars.

Although, according to the above-described state of the art, a decrease in brake squeal can be obtained, the problem common to this state of the art is that relatively many individual parts are required to improve the noise behavior, which parts in addition must be mounted with correspondingly high effort.

Finally, an inside shoe drum brake is known from German Patent Publication DE 2,903,051 A1 which has a brake anchor plate with larger material thickness. The brake anchor plate has several arms which extend radially, one of which forms the housing of the wheel brake cylinder, whereas the other arms comprise at their ends guide slits into which U-shaped spring clamps are inserted, which serve to axially guide the brake shoes on their bars.

In this rigid design of the brake anchor plate, a good overall noise behavior of the inside shoe drum brake can certainly be expected, however, such a brake anchor plate cannot be manufactured economically because, on the one hand, it must be cast in molds with associated spoiled casting, and, on the other hand, the formation of the guide slits requires an additional work step.

BRIEF SUMMARY OF THE INVENTION

Therefore, an object of the invention is to provide a simply designed inside shoe drum brake which has an optimized noise behavior.

This object is solved by an inside shoe drum brake having a guide element which is engaged in the axial direction of the brake with the brake shoes and which is guided in a sliding manner on the attachment area of the brake anchor plate to the wheel carrier, or on the actuation device.

The result is that, by means of the guide element, the brake shoes are always braced in the axial direction of the brake with respect to an oscillation-neutral area, so that no brake squeal occurs. Since, in contrast to the state of the art, no contact and/or guiding of the brake shoes takes place in the outside areas of the brake anchor plate, the latter can advantageously be optimized insofar as lightweight construction, that is a weight reduction, is concerned, particularly by an improved utilization of materials with area-specific attribution of the required rigidity properties on the attachment area and the actuation device, respectively. In addition, the plurality of guide elements provided in the outside area of the brake anchor plate according to the state of the art, is no longer necessary, so that in the manufacture of the inside shoe drum brake according to the invention, components and work steps are eliminated, which is of particular advantage in mass production.

According to one embodiment, the guiding of the guide element is by means of a support, located in the middle, on the attachment area, and by means of a groove in the housing of the wheel brake cylinder. According to a particularly economic variant, the semifinished product for the wheel brake cylinder already has a guide groove which has exact dimensions, so that no additional work steps are required for the formation of the guide groove.

The guide element may be constructed as a folded profiled part with a substantially U-shaped cross section, consisting preferably of steel or aluminum sheet material. Accordingly, a lightweight component is provided which presents a sufficient resistance to buckling due to its hollow profile. Moreover, the resetting springs for the brake shoes, the brake lever of a hand brake device, and/or the setting key of a mechanical adjustment device can advantageously be contained in the interior of the hollow profile.

Because, the width of the guide slits at the ends of the guide element is smaller than the thickness of the brake shoe bars inserted into the guide slits, the brake shoe bars are elastically clamped. As a result, the brake shoes are precisely guided in the axial direction in an advantageously simple manner without additional components.

In order to guide the guide element on the attachment area or the actuation device in a sliding manner, the web of the guide element, which is turned towards the brake anchor plate, has a prolonged (or extended) section substantially in its middle, which extends either in the direction of the webs or in the opposite direction. Such a section can be realized in a simple manufacture manner by fine cutting and deformation of the steel plate and aluminum plate, respectively, of the guide element.

The guide element comprises stops at its ends, which inwardly limit the motion of the brake shoes away from the brake drum. As a result, the guide element also serves as a pressure rod of a known hand brake device and mechanical adjustment device, respectively, for which purpose it has in addition a recess through which a brake lever (which is pivotally connected to one of the brake shoes), passes with clearance, or it comprises a slit into which a biased setting key is inserted which separates one of the stops from the corresponding brake shoe. This multiple function of the guide element contributes to a reduction of the number of components of the inside shoe drum brake, a reduction which constitutes an advantage not only because of the reduction in the manufacture costs but additionally because of the reliability of the inside shoe drum brake.

The brake anchor plate has a support part carrying the support arrangement and the actuation device, as well as comprising the attachment area, and a contour part having on at least one side an oscillation-rigid honeycombed structure. on the one hand, the lightweight construction of the inside shoe drum brake is aided, wherein only the support part must have large dimensions, suitable to meet its rigidity requirements, whereas the rigidity properties of the contour part are secondary, the latter having primarily a dirt repelling function. On the other hand, by means of the design of an oscillation-rigid honeycombed structure on the contour part, the contour part is reliably prevented from starting to oscillate with noise production during the operation of the inside shoe drum brake.

According to one design of the brake anchor plate, the support part is formed from steel or aluminum sheet material, whereas the contour part is made of a plastic material. The design is particularly lightweight and cost effective, wherein, for example, even recycled plastic materials can be used.

The contour plate may be permanently secured to the support plate by methods such as heat-embedding or injection molding. By using such methods, the brake anchor plate can be produced advantageously with regard to the manufacture and the assembly technology. Alternatively, the contour plate may be removably connected to the support plate to permit recycling of the brake anchor plate.

BRIEF DESCRIPTION OF THE SEVERAL VIEWS OF THE DRAWINGS

The invention is described in further detail below with reference to preferred embodiments and the drawing where the same or similar parts are identified by the same reference signs. In the drawing:

FIG. 1 is a top view of a first embodiment of the inside shoe drum brake according to the invention with removed brake drum, wherein the guide element is guided at the attachment area of the brake anchor plate, FIG. 2 represents the section along line A—A of FIG. 1, FIG. 3A is a top view on the guide element of the first embodiment, wherein the prolonged middle section extends in the direction of the webs of the guide element, FIG. 3C represents the section along line B—B in FIG. 3A, FIG. 4A is a top view of a variant of the guide element according to FIG. 3A, wherein the prolonged middle section extends in the opposite direction of the webs of the guide element, FIG. 4B represents the section along line C—C in FIG. 4A.

DETAILED DESCRIPTION OF THE INVENTION

Figure 3B:
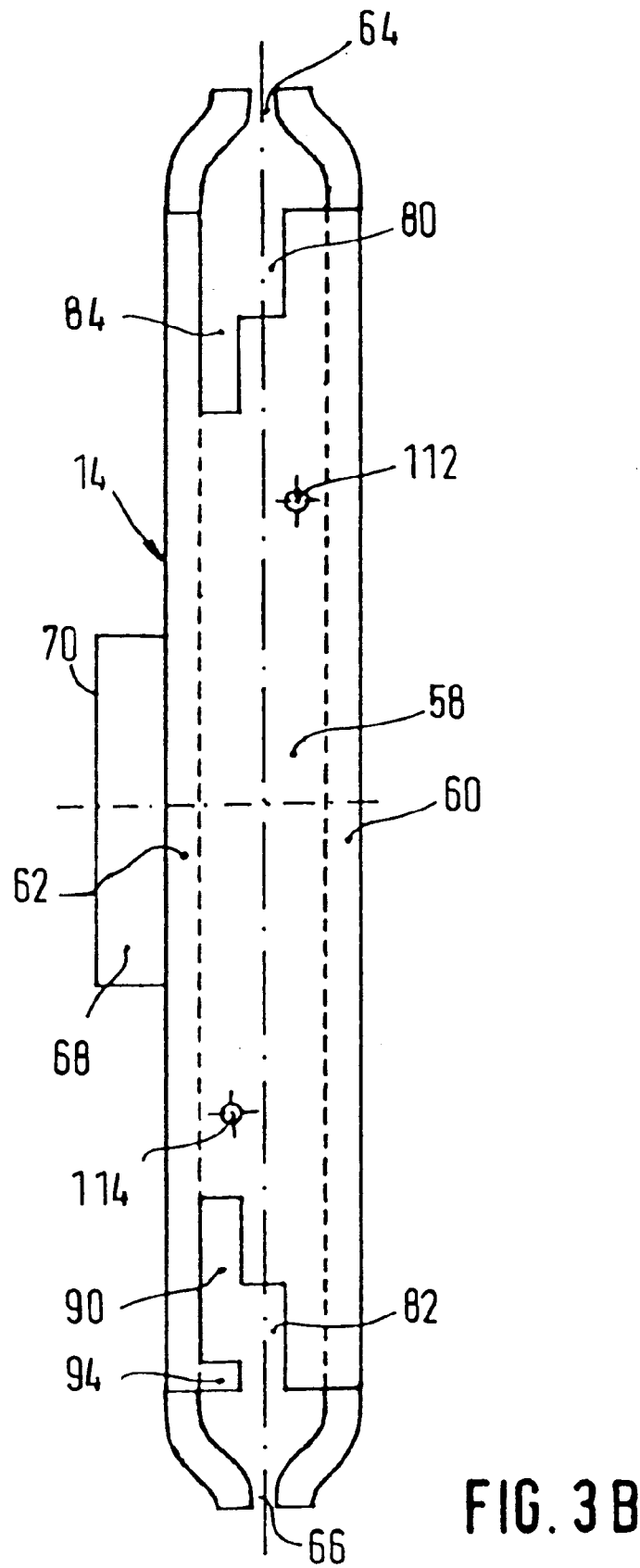
FIG. 3B is a lateral view of the guide element of the first embodiment, from the left side in FIG. 3A.

FIG. 1 shows the first embodiment of the inside shoe drum brake according to the invention in the unactuated state. According to FIG. 1, the inside shoe drum brake has a brake anchor plate 2 on which a support arrangement 4 is provided to receive the circumferential forces of the brake shoes 6, 8. An actuation device is provided in the form of a hydraulic wheel brake cylinder 10. During operation of the inside shoe drum brake, the brake cylinder 10 presses the brake shoes 6, 8 against the brake drum (not shown). The brake anchor plate 2 comprises, in its middle, an attachment area 12 by means of which the brake anchor plate 2 can be attached to a wheel carrier (not shown). A guide element 14 in the form of a longitudinal pressure rod is provided between the brake shoes 6, 8. The guide element 14 engages with the brake shoes 6, 8 in the axial direction of the brake, that is perpendicular to the plane of the drawing, and is guided in a sliding motion on the attachment area 12, as will be described in greater detail.

The support arrangement 4 consists of a sheet plate 16 which is attached by means of rivets (FIG. 2) or plate connection points 18 (FIGS. 7 and 8), on a cupped section 20. The cupped section 20 is formed by deep drawing of the brake anchor plate 2. According to FIG. 6, the cupped section 20 has an area 22 which is offset in the direction of the attachment area 12. The area 20 in combination with the sheet plate 16, form slits on both sides of the cupped section 20, into which the lower ends, in FIG. 1, of the respective brake shoe 6, 8 are inserted with little axial clearance. The circumferential forces which are developed during a brake process are received by lateral surfaces 24 (FIG. 6) of the cupped section 20, against which the lower ends, in FIG. 1, of the brake shoes 6, 8 are abutted, with prestress from a resetting spring 25 which extends between the brake shoes 6, 8 in the area of the support arrangement 4.

The brake shoes 6, 8 which have essentially a T-shaped cross section each comprise, in a manner known per se, a bar 26, 28 on which a bent brake lining support plate 30, 32 is attached which carries the brake lining 34, 36. The upper ends, in FIG. 1, of the bars 26, 28 abut against pistons 38, 40 of the wheel brake cylinder 10. The pistons 38, 40 are received in a sliding manner by a cylinder bore 44 formed in a housing 42 of the wheel brake cylinder 10. As can particularly be seen in FIG. 2, the housing 42 has two bores 46, 48 which extend from the direction of the brake anchor plate 2 to the cylinder bore 44. The lower bore 46, in FIG. 2, serves to connect the wheel brake cylinder 10 to the hydraulic pressure line (not shown) leading to the main brake cylinder, whereas the upper bore 48, in FIG. 2, is a threaded bore to receive a vent valve (not shown). Further, the housing 42 comprises a staggered cylindrical step 50 which passes through an opening 52 formed in the brake anchor plate 2.

According to FIG. 1, the attachment area 12 comprises a central opening 54 for the axle, which is surrounded by a plurality of attachment bores 56. Since the brake anchor plate 2 has a relatively thick material thickness in the attachment area 12, and since the attachment area 12 is screwed at the attachment bores 56 with the wheel carrier (not shown), the attachment area 12 cannot oscillate, that is it is an oscillation-neutral area.

With reference to FIGS. 1 to 3C, the guide element 14 and its connection to the other components of the inside shoe drum brake are described in further detail. In the embodiment represented, the guide element 14 is formed as a single-part pressure rod of constant length. The guide element 14 is a component of a hand brake device and a mechanical adjustment device for compensating for any excess ventilation clearance, as is known in principle from German Patent Publication DE 2,644,575 C3 (which corresponds to U.S. Pat. No. 4,232,766).

According to FIGS. 3A to 3C, the guide element 14 (which is represented after a 90° rotation as compared to FIG. 1) is designed as a folding profiled part preferably made of steel or aluminum sheet material. The guide element 14 has essentially a U-shaped cross section, which comprises a folding back 58 and webs 60, 62. The webs 60, 62 extend vertically away from the folding back 58 and essentially parallel to each other. The webs 60, 62 are prolonged on both sides of the folding back 58 beyond the latter, both vertically and also in the direction of the folding back 58. The webs 60, 62 are bent inwardly towards each other to form guide slits 64, 66 at both ends of the guide element 14 for receiving the bars 26, 28 of the brake shoes 6, 8. The webs 60, 62 of the guide element 14 are preferably bent inwardly a distance such that the width of the guide slits 64, 66 is smaller than the thickness of the brake shoe bars 26, 28. Hence, the brake shoe bars 26, 28 are elastically clamped by the guide slits 64, 66 in the built-in state of the guide element 14. The brake shoe bars 26, 28 can also be held with clearance in the guide slits 64, 66.

In the built-in state of the guide element 14, the web 62 is turned towards the brake anchor plate 2. The web 62 comprises a web section 68 prolonged in the direction of the brake anchor plate 2. The web section 68 is designed symmetrically with respect to the vertical symmetry axis of the guide element 14 in the built-in position. The web section 68 has a plane surface 70 which, in the built-in state of the guide element 14, is turned towards the brake anchor plate 2, and which runs parallel to the guide slits 64, 66 of the guide element 14. The guide element 14 is guided in a sliding motion over the plane surface 70 on the attachment area 12 of the brake anchor plate 2, wherein the plane surface 70 is in a flat contact with the oscillation-neutral attachment area 12, as can particularly be seen in FIG. 2.

A longitudinal hole 72 is formed in the web section 68 of the guide element 14. The hole 72 extends in the longitudinal extension direction of the guide element 14, and serves to axially fix the guide element 14 to the support 74 on the brake anchor plate 2. According to FIGS. 1 and 2, the support 74 consists of a bolt 76 which passes through the longitudinal hole 72 of the web section 68 and which is attached to the attachment area 12 on the symmetry axis of the brake anchor plate 2, which is vertical in FIG. 1. A spring clamp 78 is mounted on the bolt 76 on the side of the web section 68 which is turned away from the brake anchor plate 2. The spring clamp 78 is braced at the bolt end and biases the guide element 14 against the attachment area 12 of the brake anchor plate 2. The spring clamp 78 is slit on its side turned away from the brake anchor plate 2 and it appears, in the horizontal cross section which runs through the bolt 76 in FIG. 1, in the shape of two letters U whose open sides are turned towards each other. Moreover, the longitudinal hole 72 on the guide element 14 has dimensions which are such that the guide element 14 can be shifted horizontally (in FIG. 1) by an amount equivalent to the ventilation clearance of the brake shoes 6, 8.

According to FIG. 3B, the folding back 58 of the guide element 14 has slits 80, 82 at both ends. The slits 80, 82 are formed symmetrically with respect to the longitudinal axis of the guide element 14. In the built-in state of the guide elements 14, the brake shoe bars 26, 28 are inserted into the slits 80, 82 with a clearance (in the longitudinal extension direction of the guide element 14) which is greater than or equal to the ventilation clearance of the brake shoes 6, 8 in FIG. 1. An additional slit 84 is formed in the right side (in FIG. 1) of the folding back 58 of the guide element 14. The slit 84, runs parallel to the slit 80 and is also connected to the slit 80. The slit 84 is provided for receiving a setting key 86 and a plate clip 88 of the mechanical adjustment device. Similarly, on the left side (in FIG. 1) of the guide element 14, the folding back 58 comprises a recess 90 which serves to receive a brake lever 92 of the hand brake device. The recess 90 runs parallel to the slit 82, is connected with it and is delimited in the direction of the guide slit 66 from a projection 94 in such a manner that the brake lever 92 is received with clearance in the longitudinal extension direction of the guide element 14 in the recess 90, which clearance is greater than or equal to the ventilation clearance of the brake shoes 6, 8.

As can be seen from FIG. 1, the brake lever 92 which passes through the recess 90 of the guide element 14 is pivotally connected to the bar 26 of the left brake shoe 6, in FIG. 1, by means of a swivel 96. The lower end, in FIG. 1, of the brake lever 92 comprises a stop 98 for the brake lining support plate 30 of the brake shoe 6, and it is equipped with an attachment eye 100 for a brake pull (not shown).

The plate clip 88 is attached to the right brake shoe 8, in FIG. 1, for example, by means of rivets, and it forms, to the left of FIG. 1, a stop for the setting key 86 which is biased towards the bottom, in FIG. 1, by a contact spring 102 which is attached to the brake shoe bar 28.

The upper ends of the brake shoe bars 26, 28 are equipped with inwardly directed recesses 104, 106. The guide element 14 is inserted between the recesses 104, 106, so that the brake shoe bars 26, 28 are inserted into the slits 80, 82 in the folding back 58 of the guide element 14. Finally, the guide element 14 is braced with the brake shoe bars 26, 28 by two return springs 108, 110 which are engaged in corresponding openings 112, 114 in the folding back 58 of the guide element 14, and which are contained in the hollow profile of the guide element 14. The return spring 108 which braces the guide element 14 with the brake shoe 6, on the left in FIG. 1, has a greater spring force than the return spring 110 which braces the guide element 14 with the brake shoe 8, on the right of FIG. 1.

The function of the first embodiment of the inside shoe drum brake according to the invention will now be described. In the unactuated state of the inside shoe drum brake, the movement of the brake shoes 6, 8, which are under tension against each other due to the return springs 25, 108, 110, is limited towards the inside by the guide element 14. In this state, the stop 98 of the brake lever 92 abuts against the brake lining support plate 30, on the left in FIG. 1, while the guide element 14 abuts against the brake lever 92 with the bottom of the recess 90, which is located opposite the projection 94, in the folding back 58 of the guide element 14. On the right side, in FIG. 1, of the guide element 14, the setting key 86 abuts against the bottom of the slit 84 in the folding back 58 of the guide element 14, while the plate clip 88 which is attached to the brake shoe 8 is pulled onto the stop against the setting key 86.

During hydraulic actuation of the inside shoe drum brake, pressure is built up in the cylinder bore 44 of the wheel brake cylinder 10, which moves the pistons 38, 40 outwardly, that is towards the left and right in FIG. 1. As a result, the brake shoes 6, 8, which are supported in the circumferential direction by the support arrangement 4, are pressed against the force of the return springs 25, 108, 110 against the inner side of the brake drum. When this occurs, the guide element 14 guides the brake shoes 6, 8 in the radial direction on their bars 26, 28 by means of the guide slits 64, 66 and by means of the longitudinal hole 72 in the web section 68. The guide element 14 also supports the brake shoes 6, 8 in the axial direction via the plane surface 70 of the web section 68 on the oscillation-neutral attachment area 12 of the brake anchor plate 2. A lifting of the plane surface 70 from the attachment area 12 is here prevented by the support 74. By the described guidance and supporting, respectively, of the brake shoe 6, 8 against the attachment area 12, brake squeal is reliably prevented. After reduction of the hydraulic pressure in the cylinder bore 44 of the wheel brake cylinder 10, the brake shoes 6, 8 are again pulled via the return springs 25, 108, 110 to their normal position which is determined by the guide element 14.

During the actuation of the hand brake device, which works independently of the hydraulic actuation of the inside shoe drum brake, the brake lever 92 is tilted via a brake pull attached to the attachment eye 100 of the brake lever 92 counterclockwise around the swivel 96. In this process, the brake lever 92 presses over the guide element 14, the setting key 86 and the plate clip 88, the brake shoe 8, on the right of FIG. 1, against the inner side of the brake drum. At the same time the brake shoe 6, on the left in FIG. 1, is pressed over the swivel 96 against the inner side of the brake drum. The radial guidance and axial bracing, respectively, of the brake shoes 6, 8 with respect to the attachment area 12 as well as the return setting of the brake shoes 6, 8 into their normal position take place as described above.

With regard to the function of the mechanical adjustment device, reference is made to German Patent Publication DE 2,644,575 C3 and corresponding U.S. Pat. No. 4,232,766. It is only noted here that the plate clip 88 has dimensions which are such that the spatial situation of the setting key 86 in the intermediate area between the guide element 14 and the plate clip 88 is maintained, independently of the force applied in pressing the guide element 14 during the actuation of the brake lever 92 against the setting key 86, and, as a rule, also independently of what vibrations occur during the drive. Further, the return spring 108 has a greater spring force than the return spring 110, in order to guarantee that the guide element 14 is always pulled against the brake shoe 6, on the left in FIG. 1, and that it is separated from the brake shoe 8, on the right in FIG. 1, by an amount which exceeds the ventilation clearance. Thus, if the ventilation clearance is exceeded, the biased setting key 86 can slide downwardly.

The above description makes it clear that the bottom of the recess 90 and the bottom of the slit 84 in the folding back 58 of the guide element 14 serve as stops and force transfer points, respectively, of the guide element 14, which limit the movement of the brake shoes 6, 8 towards the inside, so that the guide element 14 also functions as a pressure rod of the hand brake device and the mechanical adjustment device, respectively. The guidance and bracing, respectively, of the brake shoe 6, 8, according to the invention, with respect to the attachment area 12 by means of the guide element 14 is independently thereof, and therefore it can, in principle, also occur when the guide element 14 does not serve as a pressure rod.

FIGS. 4A and 4B show a variant of the guide element 14 shown in FIGS. 1 to 3C, which differs from the latter only in that the web 62 (which in the built-in state of the guide element 14 is turned towards the brake anchor plate 2), comprises a bent web section 116 which extends (in the sectional view according to FIG. 4B), from the folding back 58 against the direction of the rods 60, 62, that is in the built-in state of the guide element 14 towards the top. This web section 116 also has a plane surface 118 which is turned towards the brake anchor plate 2 in the built-in state of the guide element 14, which surface runs parallel to the guide slits 64, 66 of the guide element 14 and guides the guide element 14 in a sliding manner on the oscillation-neutral attachment area 12 of the brake anchor plate 2 and, as compared to the guide element 14 according to FIGS. 1 to 3C, closer to the wheel brake cylinder 10.

Figure 5:
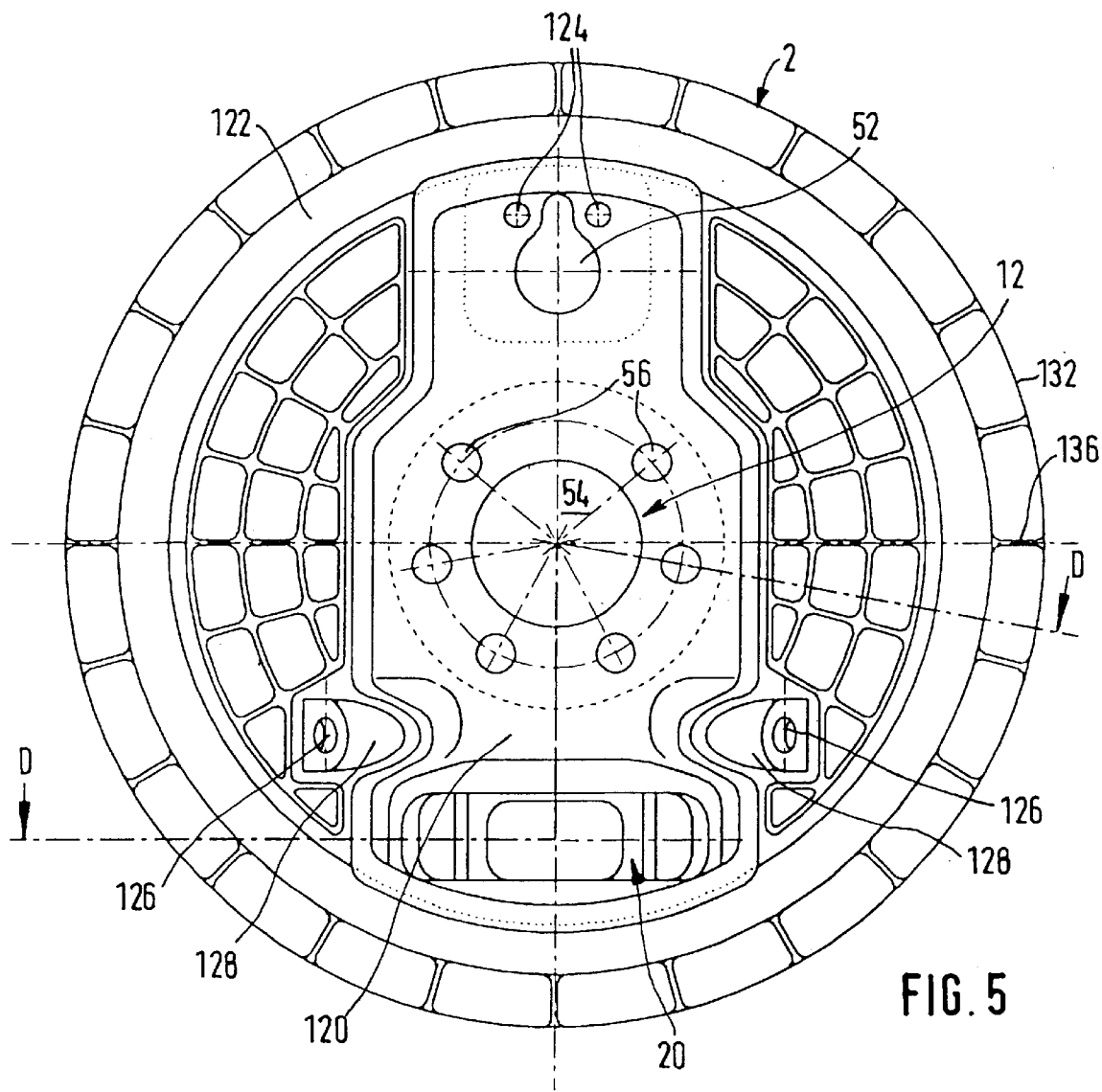
FIG. 5 is a back view of the brake anchor plate of the first embodiment, without mounted brake shoes, support arrangement and actuation device.
Figure 6:
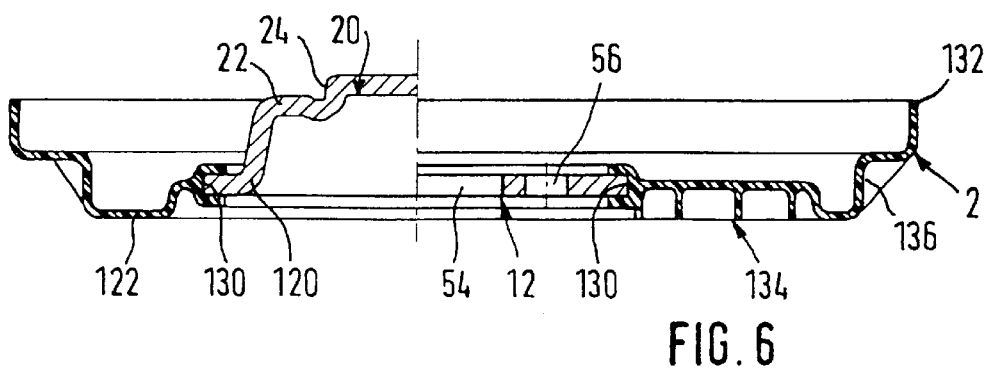
FIG. 6 represents the section along line D—D in FIG. 5.

In FIGS. 5 and 6, the brake anchor plate 2 of the first embodiment of the inside shoe drum brake according to the invention is shown prior to the mounting of the brake shoes 6, 8, the support arrangement 4, and the wheel brake cylinder 10. Since the brake shoes 6, 8 are guided and braced, centrally on the attachment area 12 of the brake anchor plate 2, as described above, the only function of the external areas of the brake anchor plate 2 is to repel dirt. As such, the brake anchor plate 2 can be designed in two parts and made of different materials.

According to FIGS. 5 and 6, the brake anchor plate 2 consists of a substantially rectangular support part 120 preferably made of steel or aluminum sheet material, and a contour part 122 preferably made of plastic, such as recycled plastic, for example. The support part 120 comprises a central opening 54 through which the axle can be passed. The central opening 54 is surrounded by attachment bores 56 for the wheel carrier (not shown), arranged on a pitch circle. An opening 52 for the cylindrical step 50 of the wheel brake cylinder 10 is formed on one side of the opening 54. Further attachment bores 124 for the wheel brake cylinder 10 are provided in the proximity of the opening 52. On the side of the support part 120, which is diametrically opposite the opening 52, the cupped section 20 for the support arrangement 4 is formed. Furthermore, between the cupped section 20 and the opening 54, cupped sections 128 (each provided with a bore 126) are provided on both sides of the support part 120. The cupped sections 128 are preferably formed by deep drawing and serve for the passage and attachment of the brake pull (not shown) of the above-described hand brake device.

The edge 130 of the support part 120 is form-fittingly surrounded over its entire circumference by the contour part 122. The contour part 122 is preferably fitted by injection molding onto the support part 120, so that it is connected inseparably to the support part 120. Heat application could also be used to embed the support part on the contour part. Alternatively, the support part and the contour part can be removably connected to each other by a snap connection, for example, as is known per se.

The contour part 122 has a circumferential collar 132 which points from the support part 120 in the direction of the brake drum, preventing, as it works in cooperation with a correspondingly shaped brake drum, the penetration of dirt, spray water or the like into the interior of the inside shoe drum brake. The side of the contour part 122 which points in the direction of the wheel carrier is provided with a honeycombed structure 134 which stiffens the contour part 122. Finally, the collar 132 of the contour part 122 is stiffened by means of a plurality of stiffening ribs 136 distributed over the circumference. By means of the above measures, the possibility of excitation of the contour part 122 into an oscillatory motion is prevented.

Although, according to the above description, the honeycombed structure 134 is placed to the side of the contour part 122 which is turned towards the wheel carrier, it is also possible for it to point into the interior of the inside shoe drum brake or it can be provided on both sides of the contour part. It is also possible to manufacture the brake anchor plate with the support part and contour part as one part using an appropriate plastic, which can be particularly advantageous in view of a lightweight construction of the inside shoe drum brake.

Figure 7:
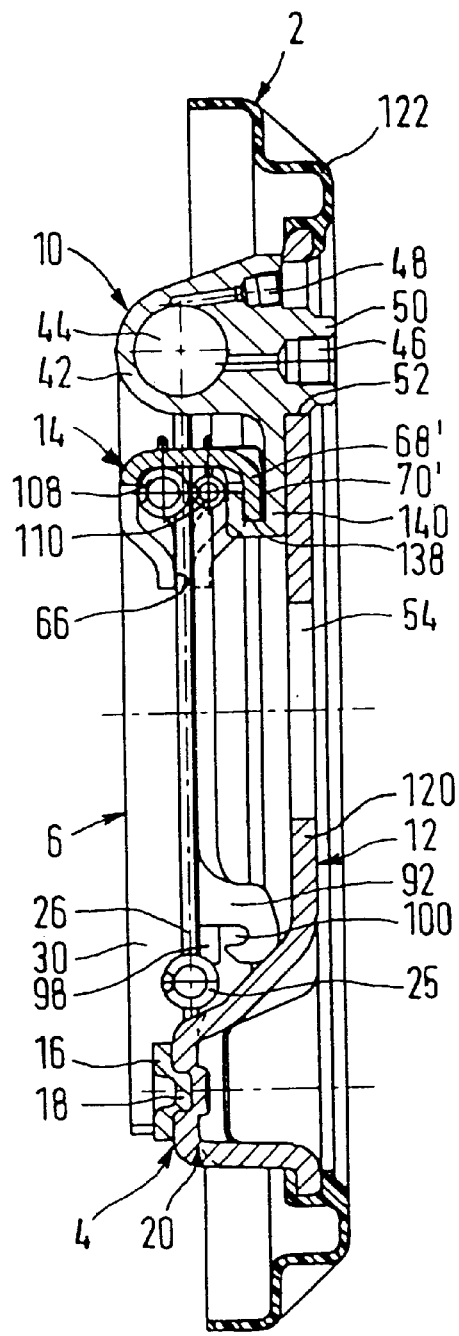
FIG. 7 is a section corresponding to FIG. 2 through a second embodiment of the inside shoe drum brake according to the invention, wherein the guide element is guided on the actuation device.

FIG. 7 shows a second embodiment of the inside shoe drum brake according to the invention. This second embodiment is described only insofar as its features differ from the first embodiment.

According to FIG. 7, a guide groove 138 is formed in the housing 42 of the wheel brake cylinder 10, which serves for the guiding and the axial bracing of the brake shoes 6, 8. For this purpose the housing 42 of the wheel brake cylinder 10 comprises an arm 140 which is extended in the direction of the opening 54 for the axle. The arm 140 prolongs the flange mounting area of the wheel brake cylinder 10 to the brake anchor plate 2 towards the bottom, in FIG. 7. At the end of the arm 140 a guide groove 138 opens planar-parallel with respect to the flange mounting surface in the direction of the cylinder bore 44 of the wheel brake cylinder 10. In this embodiment, the guide element 14 which is described with reference to FIGS. 3A to 3C is used, but the web section 68' does not comprise a longitudinal hole. Rather, the web section 68' of the guide element 14 is inserted into the guide groove 138 with clearance fit, which thus forms a sliding seat for the guide element 14 and at the same time fixes the guide element 14 in the axial direction of the inside shoe drum brake with bracing via the plane surface 70' of the web section 68'. Since the housing 42 of the wheel brake cylinder 10 is flange mounted, adjacent to the attachment area 12 to the wheel carrier, on the rigid support part 120 of the brake anchor plate 2, the guidance and axial bracing, respectively, of the brake shoes 6, 8, takes place in an oscillation-neutral area of the brake anchor plate 2.

The housing 42 of the wheel brake cylinder 10 is preferably made of a drawn or extruded semifinished product made, for example, of aluminum, in which the guide groove 134 has already been formed so that no additional expenditure is required for the manufacture of the guide groove 138.

Figure 8:
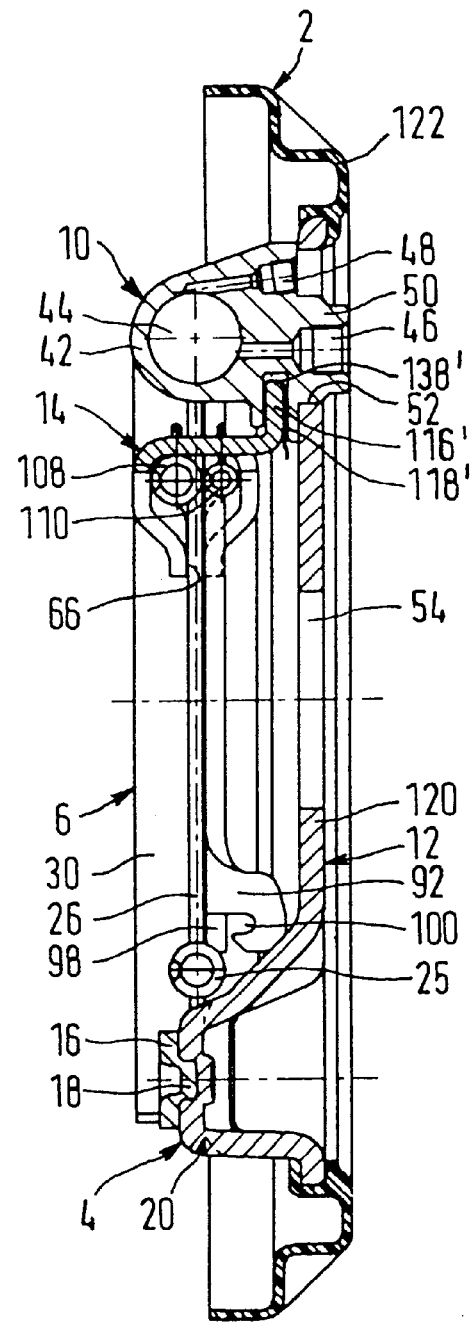
FIG. 8 is a section corresponding to FIG. 2 through a variant of the second embodiment according to FIG. 7.

FIG. 8 shows a variant of the second embodiment of the inside shoe drum brake according to the invention, in which the guide groove 138' is formed in the vicinity of the cylinder bore 44 in the housing 42 of the wheel brake cylinder 10, and in which the variant of the guide element 14 which is described with reference to FIGS. 4A and 5B is used, also without longitudinal hole. The web section 116' is inserted into the guide groove 138' which opens towards the bottom, in FIG. 8, so that it guides the guide element 14 in a sliding manner on the housing 42 and it fixes it in the axial direction of the inside shoe drum brake with bracing via the plane surface 118'.

An inside shoe drum brake, particularly for motor vehicles, is disclosed which comprises a support arrangement for the brake shoes which can be pressed by means of an actuation device against the brake drum, and which has a brake anchor plate carrying the support arrangement and the actuation device as well as comprising an area for the attachment to a wheel carrier. According to the invention, a guide element is provided which is engaged in the axial direction of the brake with the brake shoes and which is guided, in a sliding manner, on the attachment area or on the actuation device. Thus a simply designed and lightweight inside shoe drum brake is provided which has an optimized noise behavior with respect to brake squeal.

We claim:

1. An inside shoe drum brake, comprising:
   at least two brake shoes;
   a support arrangement for the brake shoes;
   an actuation device for selectively moving the brake shoes against a brake drum;
   a brake anchor plate which carries the support arrangement and the actuation device, and which includes an attachment area for connection to a wheel carrier; and
   a guide element which is engaged with the brake shoes in the axial direction of the brake; and
   a support formed substantially in the middle of the attachment area, the support guiding the guide element in a sliding manner.

2. An inside shoe drum brake, comprising:
   at least two brake shoes;
   a support arrangement for the brake shoes;
   an actuation device for selectively moving the brake shoes against a brake drum;
   a brake anchor plate which carries the support arrangement and the actuation device, and which includes an attachment area for connection to a wheel carrier;
   a guide element which is engaged with the brake shoes in the axial direction of the brake, and which is guided in a sliding motion directly on one of the attachment area and the actuation device; and
   a support formed substantially in the middle of the attachment area and guiding the guide element in a sliding manner, the support comprising:
      a bolt fixed to the attachment area, the bolt extending through a longitudinal hole formed in the guide element; and
      a spring clamp biasing the guide element against the attachment area.

3. An inside shoe drum brake, comprising
   at least two brake shoes;

a support arrangement for the brake shoes;

an actuation device for selectively moving the brake shoes against a brake drum;

a brake anchor plate which carries the support arrangement and the actuation device, and which includes an attachment area for connection to a wheel carrier; and a guide element which is engaged with the brake shoes in the axial direction of the brake, and wherein the actuation device comprises a hydraulic wheel brake cylinder having a housing which includes a groove adapted to guide the guide element in a sliding manner.

4. An inside shoe drum brake according to claim 3, wherein said guide groove is preformed in said housing of said wheel brake cylinder.

5. An inside shoe drum brake according to claim 2, wherein the guide element includes a pair of guide slits for receiving a brake shoe bar from a corresponding brake shoe.

6. An inside shoe brake according to claim 5, wherein said guide element has an essentially U-shaped cross section.

7. An inside shoe brake according to claim 5, wherein said slits are disposed at opposite ends of the guide element.

8. An inside shoe drum brake according to claim 5; wherein each of said guide slits is formed by a pair of webs which extend from respective ends of said guide element, said webs being crimped towards one another to form a respective slit.

9. An inside shoe drum brake according to claim 5, wherein the width of said guide slit is smaller than the thickness of said brake shoe bar, so as to elastically clamp said brake shoe bar.

10. An inside shoe drum brake according to claim 8, wherein the web of the guide element, which is turned towards the brake anchor plate, comprises a prolonged section substantially in its middle and guides the guide element in a sliding manner on the attachment area.

11. An inside shoe drum brake according to claim 2, wherein the guide element has stops at its ends which inwardly limit the motion of the brake shoes away from the brake drum.

12. An inside shoe drum brake, comprising:

at least two brake shoes;

a support arrangement for the brake shoes;

an actuation device for selectively moving the brake shoes against a brake drum;

a brake anchor plate which carries the support arrangement and the actuation device, and which includes an attachment area for connection to a wheel carrier; and a guide element which is engaged with the brake shoes in the axial direction of the brake, and which is guided in a sliding motion directly on one of the attachment area and the actuation device, the guide element having stops at its ends which inwardly limit the motion of the brake shoes away from the brake drum, the guide element further having a slit into which is inserted a biased setting key of mechanical adjustment device, the setting key separating one of the stops from the corresponding brake shoe.

13. An inside shoe drum brake according to claim 11, wherein said guide element has a recess through which a brake lever of a hand brake device passes with clearance, said brake lever being pivotally connected to one of said brake shoes.

14. An inside shoe drum brake according to claim 2, wherein the brake anchor plate has a support part carrying the support arrangement and the actuation device, as well as comprising the attachment area, and a contour part comprising on at least one side a honeycombed structure which is oscillation-rigid.

15. An inside shoe drum brake according to claim 14, wherein said support part is formed from metal, whereas said contour part is formed of plastic.

16. An inside shoe drum brake according to claim 15, wherein said contour part is injection molded onto said support part in a form-fitting manner, or that said support part is embedded with heat application in said contour part.

17. An inside shoe drum brake according to claim 15, wherein said contour part is removably connected to said support part.

18. An inside brake shoe according to claim 16 wherein the support part is embedded in said contour part with heat application.

19. An inside shoe drum brake of the type connectable to a wheel carrier, comprising: a brake anchor plate having an attachment area for connection to the wheel carrier;

a support arrangement secured to the brake anchor plate;

an actuation device secured to the brake anchor plate;

a pair of brake shoes, each brake shoe having one end pivotally connected to the support arrangement and the other end positioned for outward movement by the actuation device; and a guide element which is engaged with the brake shoes to limit their movement in the axial direction, and which is slidably and directly connected to one of the attachment area and the actuation device.

20. An inside shoe drum brake according to claim 3, wherein the guide element includes a pair of guide slits for receiving a brake shoe bar from a corresponding brake shoe.

21. An inside shoe drum brake according to claim 20, wherein the guide element has an essentially U-shaped cross section.

22. An inside shoe drum brake according to claim 20, wherein the guide slits are disposed at opposite ends of the guide element.

23. An inside shoe drum brake according to claim 20, wherein each of the guide slits is formed by a pair of webs which extend from respective ends of the guide element, the webs being crimped towards one another to form a respective slit.

24. An inside shoe drum brake according to claim 20, wherein the width of the guide slit is smaller than the thickness of the brake shoe bar, so as to elastically clamp the brake shoe bar.

25. An inside shoe drum brake according to claim 23, wherein the web of the guide element, which is turned towards the brake anchor plate, comprises a prolonged section substantially in its middle and guides the guide element in a sliding manner on one of the actuation device.

26. An inside shoe drum brake according to claim 3, wherein the guide element has stops at its ends which inwardly limit the motion of the brake shoes away from the brake drum.

27. An inside shoe drum brake according to claim 26, wherein the guide element has a recess through which a brake lever of a hand brake device passes with clearance, the brake lever being pivotally connected to one of the brake shoes.

28. An inside shoe drum brake according to claim 3, wherein the brake anchor plate has a support part carrying the support arrangement and the actuation device, as well as comprising the attachment area, and a contour part comprising on at least one side a honeycombed structure which is oscillation-rigid.

29. An inside shoe drum brake according to claim 28, wherein the support part is formed from metal, whereas the contour part is formed of plastic.

30. An inside shoe drum brake according to claim 29, wherein the contour part is injection molded onto the support part in a form-fitting manner.

31. An inside shoe drum brake according to claim 29, wherein the contour part is removably connected to the support part.

32. An inside shoe drum brake according to claim 29, wherein the support part is embedded in the contour part with heat application.

\* \* \* \* \*